United States Patent
Pradel et al.

(10) Patent No.: US 7,148,292 B2
(45) Date of Patent: Dec. 12, 2006

(54) METHOD FOR HYDROGENATION OF POLYMERS IN DISPERSED MEDIUM

(75) Inventors: Jean-Laurent Pradel, Bernay (FR); Pierre Nogues, Bernay (FR); Christophe Loret, Fontainebleau (FR)

(73) Assignee: Arkema, Puteaux (FR)

( * ) Notice: Subject to any disclaimer, the term of this patent is extended or adjusted under 35 U.S.C. 154(b) by 0 days.

(21) Appl. No.: 10/510,830

(22) PCT Filed: Apr. 11, 2002

(86) PCT No.: PCT/FR02/01261

§ 371 (c)(1),
(2), (4) Date: Jun. 22, 2005

(87) PCT Pub. No.: WO03/093326

PCT Pub. Date: Nov. 13, 2003

(65) Prior Publication Data

US 2005/0261445 A1    Nov. 24, 2005

(51) Int. Cl.
*C08C 19/02* (2006.01)
*C08F 8/04* (2006.01)
*C08F 8/42* (2006.01)

(52) U.S. Cl. .................. 525/338; 525/376; 525/380; 525/329.3; 525/333.2; 525/332.8; 525/333.1

(58) Field of Classification Search ............... 525/376, 525/338, 380, 329.3, 333.2, 332.8, 333.1
See application file for complete search history.

(56) References Cited

U.S. PATENT DOCUMENTS

| | | | | |
|---|---|---|---|---|
| 4,452,950 A | * | 6/1984 | Wideman | 525/339 |
| 5,057,601 A | * | 10/1991 | Schiessl et al. | 528/483 |
| 5,302,696 A | * | 4/1994 | Schiessl | 528/487 |
| 5,424,356 A | | 6/1995 | Parker et al. | |
| 5,442,009 A | * | 8/1995 | Parker et al. | 524/555 |
| 5,886,112 A | | 3/1999 | Vuillemin et al. | |
| 5,902,889 A | | 5/1999 | Wideman et al. | |
| 2003/0069380 A1 | | 4/2003 | Flat et al. | |

FOREIGN PATENT DOCUMENTS

| | | |
|---|---|---|
| EP | 0524 054 B1 | 1/1993 |
| EP | 0 749 987 B1 | 3/1999 |
| FR | 98.03793 | 3/1998 |
| WO | 91/06579 | 5/1991 |
| WO | 92/17512 | 10/1992 |
| WO | 00/09576 | 2/2000 |
| WO | WO 00/09576 * | 2/2000 |

* cited by examiner

*Primary Examiner*—Ling-Sui Choi
(74) *Attorney, Agent, or Firm*—Smith, Gambrell & Russell, llp.

(57) ABSTRACT

The invention concerns a method for hydrogenation of unsaturated polymers in dispersed medium based on an oxidation-reduction system containing hydrazine, an oxidant such as a peroxide and optionally a carboxylic acid. The hydrogenation rate can reach 100% in certain conditions.

16 Claims, No Drawings

METHOD FOR HYDROGENATION OF POLYMERS IN DISPERSED MEDIUM

FIELD OF THE INVENTION

The invention relates to the hydrogenation of unsaturated polymers, and particularly to the hydrogenation of unsaturated polymers in a dispersed medium, using an oxidation/reduction system based on hydrazine or one of its derivatives, on an oxidizing agent and optionally a carboxylic acid.

BACKGROUND OF THE INVENTION

It is known that the chemical structure of a polymer conditions its physicochemical properties. For example, polymers including one or more ethylenic double bonds, hereinafter denoted by unsaturated polymers, are flexible and elastic. For this reason, they have many applications.

However, their applications are limited as the ethylenic double bonds are sensitive to oxidation, which renders unsaturated polymers unstable with regard to thermal and/or UV aging.

On reducing the degree of unsaturation of unsaturated polymers, their sensitivity to oxidation is reduced. The reduction in the degree of unsaturation is generally carried out by hydrogenation.

For some applications, it is necessary to find a compromise between the elasticity of a polymer and its sensitivity to oxidation. Hence the advantage of a controlled hydrogenation technique.

The hydrogenation method and the reactions employed are known and widely described. Mention may be made of some, by way of indication.

WO 00/009576 discloses the use of a system comprising hydrazine, an oxidizing agent and a catalyst comprising an element from group 13 of the Periodic Table for the hydrogenation of unsaturated polymers, such as elastomers based on nitrile and on butadiene denoted by NBR.

U.S. Pat. No. 5,302,696 discloses a process for the hydrogenation of latex by the use of hydrazine, an oxidizing agent and an iron or copper salt. Application to the NBR latex.

WO 91/06579 discloses a preparation of coagulated rubber comprising little unsaturation from an NBR latex hydrogenated in the presence of hydrazine and of an oxidizing agent.

U.S. Pat. No. 5,902,889 discloses a process for the hydrogenation of unsaturated fatty acids in aqueous solution in the form of salts by hydrazine in the presence of an oxidizing agent and of a metal salt.

U.S. Pat. No. 5,442,009 discloses a process for the preparation of a hydrogenated "dry" rubber by hydrogenation of a latex in the presence of an oxidizing agent, of hydrazine and of a metal salt. Application to NBR latexes.

U.S. Pat. No. 5,424,356 discloses the preparation of hydrogenated rubber by the treatment of a latex (NBR) with an oxidizing agent in the presence of hydrazine and of a metal salt.

WO 92/17512 discloses the hydrogenation of unsaturated latexes in the presence of an oxidizing agent, hydrazine and a metal salt. The latexes cited are (I) butadiene, (II) acrylonitrile, isoprene or butadiene and/or (III) styrene copolymers.

U.S. Pat. No. 4,452,950 discloses the hydrogenation of the double bonds of an unsaturated polymer in the form of a latex in the presence of hydrazine, of an oxidizing agent and of a metal salt.

As may be observed, all these documents disclose a hydrogenation process based on the presence of a metal salt.

DESCRIPTION OF INVENTION

Applicant has looked for and has developed a hydrogenation process which is easy to implement, which is inexpensive and which does not require the use of a metal salt.

The process for the hydrogenation of unsaturated polymers according to the invention, and which constitutes the first subject matter of the invention, is based on an oxidation/reduction system employing hydrazine, an oxidizing agent and optionally a carboxylic acid.

To apply the process of the invention, it is necessary for the unsaturated polymer to be dispersed in an aqueous medium. It is therefore easily applicable to stable latexes of unsaturated polymers. However, it is not limited to such latexes. It also applies to all unsaturated polymers, whether liquid or solid, pure or in solution, provided that they are dispersible in water with mechanical stirring.

The following procedure is used to carry out the process of the invention: the unsaturated polymer is dispersed in water by simple mechanical stirring, all or a portion of the hydrazine and optionally a carboxylic acid is/are subsequently added, the reaction medium is heated to the desired temperature and then optionally the remainder of the hydrazine and the oxidizing agent are introduced by running in cocontinuously.

If the unsaturated polymer is in the form of a latex, the various additives are added directly to this latex.

If the unsaturated polymer is liquid or in the form of a powder, it is dispersed in the water by simple mechanical stirring. On the other hand, if the polymer to be hydrogenated is solid, it is, in a first step, dissolved in a minimum amount of organic solvent and subsequently dispersed.

If the unsaturated polymer is soluble in water, the hydrogenation is carried out directly in the aqueous solution.

Mention may be made, as unsaturated polymers which can be hydrogenated according to the invention, of:

functional or nonfunctional oligomers of dienes, such as the oligomers of butadiene, of isoprene, of 2,3-dimethylbutadiene or of chloroprene, and their copolymers with one another or with one or more other vinyl monomers, such as styrene or its substituted derivatives, acrylonitrile, alkyl acrylates or methacrylates, vinyl ethers, vinyl esters, halogenated alkenes ($VF_2$, VCM, and the like) and allyl ethers.

These oligomers can be obtained by any known polymerization process: radical, anionic, Ziegler-Natta, metathesis, and the like.

These oligomers can be functionalized at the chain end or on the chain, such as, for example, hydroxytelechelic, aminotelechelic or carboxytelechelic polybutadienes, maleicized polybutadienes, carboxytelechelic copolymers of butadiene and of acrylonitrile, copolymers of butadiene and of styrene, and the like.

Solid unsaturated polymers dispersed in water, in the form of functional or nonfunctional latexes, and powder dispersions comprising dienes, such as butadiene, isoprene, 2,3-dimethylbutadiene or chloroprene, and their copolymers with one another or with one or more other vinyl monomers, such as styrene or its substituted derivatives, acrylonitrile, alkyl acrylates or methacrylates, vinyl ethers, vinyl esters, halogenated alkenes ($VF_2$, VCM and the like) and allyl ethers.

Solid unsaturated polymers dissolved in an organic solvent, which solution is dispersible in water, comprising dienes, such as butadiene, isoprene, 2,3-dimethylbutadiene or chloroprene, and their copolymers with one another or with one or more other vinyl monomers, such as styrene or its substituted derivatives, acrylonitrile, alkyl acrylates or methacrylates, vinyl ethers, vinyl esters, halogenated alkenes ($VF_2$, VCM, and the like) and allyl ethers.

These polymers can be obtained by any known polymerization process: radical, anionic, Ziegler-Natta or metathesis.

The solvent which makes their dispersion in water possible can be an aliphatic hydrocarbon, an aromatic hydrocarbon, a cyclic or noncyclic ether, an alcohol, or the like. Mention will be made, by way of examples, of hexane, heptane, benzene, toluene, ethylbenzene, ethyl ether, butyl ether, tetrahydrofuran, methanol, ethanol, isopropanol, and the like.

Solid or dissolved polymers comprising unsaturations not resulting from diene monomers, for example polymers which comprise unsaturated chain defects following their preparation process. Mention will be made, by way of indication, of PVC, of PMMA, and the like, whatever their process of synthesis (bulk, suspension or emulsion).

The reducing agent is hydrazine or one of its derivatives, such as, for example, hydrazine hydrate, hydrazine mono- and dihydrohalides, or hydrazine carboxylates.

The oxidizing agent can be oxygen or a peroxide R—OO—R', where R and R' can be hydrogen or saturated, linear, cyclic or branched, alkyl residues. Mention will be made, by way of example, of hydrogen peroxide, butyl hydroperoxide, dicumyl peroxide, and the like.

The carboxylic acid used as catalyst is chosen from the family of the aliphatic or aromatic carboxylic acids, such as, for example, formic acid, acetic acid, benzoic acid, stearic acid, and the like, or their alkaloid salts.

This process involves the in situ formation of the reactive entity, the diimide, which is a selective hydrogenation agent for C—C double bonds by cis addition of a proton pair and release of nitrogen.

Hydrogenation takes place in any reactor equipped with a temperature regulating system, an efficient stirrer, feed pumps, a valve for removing gaseous discharges and optionally a condenser.

The stirrer is defined as efficient when it makes possible correct exchange of the reactive entities between the aqueous phase and the organic phase. The choice will be made, depending on the viscosity of the products and on their behavior in dispersion in water, between an anchor stirrer, an impeller, a turbine mixer or a helical rotor, or a combination of these components. The reactor can also be equipped with a baffle.

The polymer to be hydrogenated is introduced into said reactor in the presence or absence of solvent, and of water (additional in the case of a polymer in the latex or dispersion form) or not. A portion of the reducing agent necessary for the hydrogenation is introduced into the reactor with the carboxylic acid. The remainder of the reducing agent will be run in continuously during the reaction with an appropriate pump, along with all the oxidizing agent using a second pump. The hydrogenation reaction is carried out between 0 and 100° C. and preferably between 50 and 100° C., at atmospheric pressure or under controlled vacuum. The advantage of carrying out the reaction under controlled vacuum is that it uses a condenser to increase the heat exchange capacity of the reactor.

The progress of the reaction can be monitored by observing the amount of heat given off or by the amount of nitrogen formed during the reaction.

The amount of reducing agent necessary for the hydrogenation is defined with respect to the amount of unsaturations to be hydrogenated. The choice will be made to have a stoichiometric excess of reducing agent, preferably between 1 and 2 and more particularly between 1.2 and 2. The amount of reducing agent introduced into the reactor at the beginning of the reaction is between 0 and 100% of the total amount and preferably between 10 and 70%. The remainder of the reducing agent is run in during the reaction over a period of between 0.1 and 5 hours and preferably between 0.5 hour and 2 hours.

The amount of carboxylic acid, used as catalyst, is chosen between 0 and 20 mol % with respect to the molar amount of reducing agent, preferably between 0 and 10% and in particular below 5%. The whole of the catalyst can be mixed with the reducing agent before or during its introduction into the reactor. There may be no carboxylic acid present, without departing from the scope of the invention, if the polymer itself carries carboxylic acid or carboxylate functional groups.

The amount of oxidizing agent necessary for the hydrogenation is defined with respect to the amount of reducing agent. A stoichiometric excess will be present, preferably in a molar ratio between 1 and 2 and more particularly between 1 and 1.5. This stoichiometric excess makes it possible to ensure that all the reducing agent is consumed at the end of the reaction. The oxidizing agent is added continuously throughout the reaction, so as to control the reaction temperature; the flow rate of oxidizing agent must make it possible to keep the chosen reaction temperature constant. The overall duration of the reaction therefore depends on the heat exchange capacity of the reactor.

At the end of the reaction, a postcuring can be carried out at the reaction temperature over 0 to 90 minutes and more particularly between 15 and 60 min.

Depending on the hydrogenated polymer obtained and on the state in which it is desired to recover it, the reaction mixture, at the end of the reaction, can be simply cooled, if it is desired to recover the hydrogenated polymer in the form of a dispersion, additivated with a nonsolvent of the hydrogenated polymer, to trigger its precipitation, or run into a second reactor comprising a nonsolvent, if it is desired to recover the hydrogenated polymer in the form of a powder. In this case, the hydrogenated polymer is recovered after washing, filtration and drying under conditions suited to its structure and to the nature of the nonsolvent.

In comparison with the conventional hydrogenation process in the presence of a transition metal and of hydrogen, this process exhibits the following advantages:

Hydrogenation in a dispersed medium, reducing the use of organic solvent.

Hydrogenation at atmospheric pressure or under reduced pressure, simplifying the industrial structures.

Final treatment of the product by precipitation, filtration, washing and pulling dry, limiting the complexity of the downstream part of the industrial unit.

Nonpolluting byproducts, such as water and nitrogen.

Selective hydrogenation of the C—C double bonds, making possible the hydrogenation of polymers with complex structures.

The following examples illustrate the invention without limiting the scope thereof.

EXAMPLES

1. Hydrogenation of Hydroxylated Polybutadiene

1.1 Example in Accordance with the Invention

Hydroxylated polybutadiene (HTPB), sold by Atofina with the Poly Bd R-45HT trademark, is hydrogenated in a jacketed glass reactor equipped with a stirrer of turbine mixer type or with a mixture of anchor stirrer and impeller, with a baffle, with a reflux condenser and with 2 pumps which make it possible to control the flow rates of reducing agent and of oxidizing agent. 100 g of HTPB with an average molecular mass of 2900, 50 g of demineralized water, 74 g of 64% by weight hydrazine hydrate in water and the equivalent of 9 g of pure acetic acid are introduced into the reactor. 74 g of 64% by weight hydrazine hydrate in water, on the one hand, and 282 g of 50% hydrogen peroxide in water, on the other hand, are charged to the feed funnels of the pumps.

The reaction mixture is heated with stirring at 300 rev/min to 65° C. The operation in which the hydrazine hydrate, at a flow rate of 74 g/h, and the hydrogen peroxide, at a flow rate of 47 g/h, are run in simultaneously is then begun. The temperature set point is fixed at 75° C. and regulated by the jacket temperature.

After the hydrogen peroxide has finished being run in, after 6 hours, the reaction medium is brought to 80° C. for 45 minutes. The medium is then cooled to ambient temperature by adding 500 ml of demineralized water and by lowering the set-point temperature.

The hydrogenated HTPB then forms a white powder in dispersion in water which is filtered off, washed with water, pulled dry and then dried in a fluidized bed. Analysis by proton NMR in deuterated chloroform makes it possible to quantitatively determine a degree of hydrogenation of 99%. The NMR analysis also confirms the preservation of the alcohol functional groups on the hydrogenated product.

1.2. Counterexample 1

The same reaction, carried out in the absence of acetic acid but in the presence of 0.1 g of copper sulfate, results in hydrogenated HTPB colored orangey-yellow which exhibits a degree of hydrogenation determined by proton NMR at 30%.

1.3. Counterexample 2

The same reaction, carried out in the absence of acetic acid and of copper sulfate, results in a hydrogenated HTPB which exhibits a degree of hydrogenation determined by proton NMR at 25%.

2. Hydrogenation of an Aqueous Dispersion of Polyurethane Based on Hydroxytelechelic Polybutadiene The preparation is carried out of an aqueous dispersion of polyurethane based on hydroxytelechelic polybutadiene as described in patent FR 98/03793 of Atofina. The dispersion thus prepared has a solids content of 30%, has a particle size of 100 nm and comprises 22% by weight of polybutadiene.

250 ml of this dispersion are introduced into the same reactor as in example 1, equipped with an anchor stirrer and an impeller, with 40.5 g of 64% hydrazine hydrate in water. As the dispersion comprises carboxylate groups for stabilization, acetic acid is not charged. 40.5 g of 64% by weight hydrazine hydrate in water, on the one hand, and 155 g of 50% hydrogen peroxide in water, on the other hand, are charged to the feed funnels of the pumps.

The reaction mixture is heated with stirring at 200 rev/min to 65° C. The operation in which the hydrazine hydrate, at a flow rate of 40 g/h, and the hydrogen peroxide, at a flow rate of 38.75 g/h, are run in simultaneously is then begun. The temperature set point is fixed at 75° C. and regulated by the jacket temperature.

After the hydrogen peroxide has finished being run in, after 4 hours, the reaction medium is brought to 80° C. for 45 minutes. The medium is then cooled to ambient temperature by lowering the set-point temperature.

A stable dispersion of polyurethane based on hydrogenated hydroxytelechelic polybutadiene with a solids content of 17.5% and a particle size of 100 nm is obtained. The hydrogenated structure of the product is confirmed, by infrared analysis and by solid NMR on a film obtained by drying the dispersion, as being greater than 99%.

3. Hydrogenation of a Styrene/butadiene/methyl Methacrylate Block Copolymer

A block terpolymer comprising 38% by weight of styrene, 38% by weight of butadiene and 24% by weight of methyl methacrylate is prepared according to EP 524 054 or EP 749 987 of Atofina.

60 g of this terpolymer, 300 g of ethylbenzene and 30 g of demineralized water are introduced into the same reactor as in example 1, equipped with a turbine stirrer, with 17 g of 64% hydrazine hydrate in water and the equivalent of 2 g of pure acetic acid. 17 g of 64% by weight hydrazine hydrate in water, on the one hand, and 64 g of 50% hydrogen peroxide in water, on the other hand, are charged to the feed funnels of the pumps.

The reaction mixture is heated with stirring at 250 rev/min to 65° C. The operation in which the hydrazine hydrate, at a flow rate of 17 g/h, and the hydrogen peroxide, at a flow rate of 16 g/h, are run in simultaneously is then begun. The temperature set point is fixed at 75° C. and regulated by the jacket temperature.

After the hydrogen peroxide has finished being run in, after 4 hours, the reaction medium is brought to 80° C. for 45 minutes. The medium is then cooled to ambient temperature by lowering the set-point temperature and by introducing 400 ml of technical grade ethanol. The hydrogenated terpolymer then forms a white powder in dispersion which is filtered off, washed with ethanol, pulled dry and then dried under vacuum.

Analysis by proton NMR in deuterated chloroform makes it possible to quantitatively determine the degree of hydrogenation of the polybutadiene block of 99.6%. The NMR analysis also confirms the preservation of the styrene and methyl methacrylate blocks.

4. Hydrogenation of a Styrene-butadiene-styrene Block Copolymer 60 g of Finaprene 602, 300 g of ethylbenzene and 30 g of demineralized water are introduced into the same reactor as example 1, equipped with a turbine mixer, with 27 g of 64% hydrazine hydrate in water and the equivalent of 3 g of pure acetic acid. 26 g of 64% by weight hydrazine hydrate in water, on the one hand, and 101 g of 50% hydrogen peroxide in water, on the other hand, are charged to the feed funnels of the pumps.

The reaction mixture is heated with stirring at 250 rev/min to 65° C. The operation in which the hydrazine hydrate, at a flow rate of 26 g/h, and the hydrogen peroxide, at a flow rate of 25 g/h, are run in simultaneously is then begun. The temperature set point is fixed at 75° C. and regulated by the jacket temperature.

After the hydrogen peroxide has finished being run in, after 4 hours, the reaction medium is brought to 80° C. for 45 minutes. The medium is then cooled to ambient temperature by lowering the set-point temperature. The hydrogenated Finaprene 602 is precipitated, by running it into 1 liter of technical grade ethanol, in the form of filaments which are pulled dry and then dried under vacuum.

Analysis by proton NMR in deuterated chloroform makes it possible to quantitatively determine a degree of hydrogenation of the polybutadiene block of 95%. The NMR analysis also confirms the preservation of the styrene blocks.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

What is claimed is:

1. A process comprising the hydrogenation of unsaturated polymers including ethylenic double bonds utilizing a reducing agent, an oxidizing agent and a carboxylic acid.

2. The process as claimed in claim 1, wherein the hydrogenation is carried out in a stable aqueous dispersion or an unstable aqueous dispersion.

3. The process as claimed in claim 2, wherein the stable aqueous dispersion is a latex, and the unstable aqueous dispersion is a mechanical dispersion.

4. The process as claimed in claim 1, wherein:
the reducing agent/unsaturation to be hydrogenated molar ratio is between 1 and 2,
the oxidizing agent/reducing agent molar ratio is between 1 and 2,
the amount of acid is between 0 and 20 mol % with respect to the reducing agent.

5. The process as claimed in claim 1, wherein the reaction is carried out at a temperature of between 0 and 100° C.

6. The process as claimed in claim 1, wherein the reducing agent is selected from hydrazine or a derivative thereof.

7. The process as claimed in claim 6, wherein the reducing agent is selected from the group consisting of hydrazine hydrate, hydrazine monohydrohalides, hydrazine dihydrohalides, and hydrazine carboxylates.

8. The process as claimed in claim 6, wherein the reducing agent is hydrazine.

9. The process as claimed in claim 1, wherein the oxidizing agent is selected from oxygen or a peroxide R—OO—R', where R and R' can be hydrogen or saturated, linear, cyclic or branched, alkyl residues.

10. The process as claimed in claim 9, wherein the oxidizing agent is selected from the group consisting of hydrogen peroxide, butyl hydroperoxide, and dicumylperoxide.

11. The process as claimed in claim 10, wherein the oxidizing agent is hydrogen peroxide.

12. The process as claimed in claim 1, wherein the carboxylic acid is selected from aliphatic or aromatic carboxylic acids.

13. The process as claimed in claim 12, wherein the carboxylic acid is selected from the group consisting of formic acid, acetic acid, benzoic acid, stearic acid, and alkaloid salts of the foregoing.

14. The process as claimed in claim 13, wherein the carboxylic acid is acetic acid.

15. The process as claimed in claim 4, wherein the hydrogenated mole ratio is between 1.5 and 2 and the oxidizing agent/reducing agent molar ratio is between 1 and 1.5.

16. The process as claimed in claim 5, wherein the temperature is between 50 and 100° C.

* * * * *